United States Patent
Gitlin et al.

[11] Patent Number: 5,243,413
[45] Date of Patent: Sep. 7, 1993

[54] COLOR PARALLAX-FREE CAMERA AND DISPLAY

[75] Inventors: Richard D. Gitlin, Little Silver; Richard V. Kollarits, Colts Neck; John F. Ribera, Howell; Clark Woodworth, Rumson, all of N.J.

[73] Assignee: AT&T Bell Laboratories, Murray Hill, N.J.

[21] Appl. No.: 939,340

[22] Filed: Sep. 2, 1992

[51] Int. Cl.⁵ ............................................... H04N 7/14
[52] U.S. Cl. ........................................ 358/55; 358/41; 358/56; 358/60; 358/58; 379/53
[58] Field of Search ..................... 358/93, 42, 58, 55, 358/225, 231, 236, 60, 62, 41, 56; 379/53, 202

[56] References Cited

U.S. PATENT DOCUMENTS

| | | | |
|---|---|---|---|
| 4,090,219 | 5/1978 | Ernstoff et al. | 358/58 X |
| 4,400,725 | 8/1983 | Tanigaki | 358/85 |
| 4,928,301 | 5/1990 | Smoot | 379/53 |
| 5,117,285 | 5/1992 | Nelson et al. | 358/85 |
| 5,159,445 | 10/1992 | Gitlin et al. | 358/85 |

FOREIGN PATENT DOCUMENTS

| | | |
|---|---|---|
| 454245 | 10/1991 | European Pat. Off. . |
| 62-258574 | 11/1987 | Japan . |
| 63-102483 | 5/1988 | Japan . |
| 63-311890 | 12/1988 | Japan . |
| 4-150683 | 5/1992 | Japan . |

*Primary Examiner*—Mark R. Powell
*Attorney, Agent, or Firm*—Gerard A. deBlasi

[57] ABSTRACT

Improved image quality is realized in a parallax-free teleconferencing display by increasing the camera light budget, that is, by increasing the light available to the camera, while maintaining a common optic axis between the camera and the display screen. Light-attenuating devices, such as color filters, are repositioned out of the path of light entering the camera. In this manner, image quality is improved while color capability is maintained.

18 Claims, 6 Drawing Sheets

COLOR PARALLAX-FREE CAMERA AND DISPLAY

TECHNICAL FIELD

This invention relates to displays and cameras and, more particularly, to displays and cameras adapted for teleconferencing applications and the like wherein images of the calling and called persons viewing the displays are recorded and displayed on the called and calling displays, respectively.

BACKGROUND OF THE INVENTION

An important obstacle in the design of video teleconferencing equipment is overcoming the problem of parallax. Parallax arises when the camera and display of a video teleconferencing system do not have a common optic axis. Without this common optic axis, there is a lack of eye contact between the conferee and the associated camera, thus creating a perception of disinterest or preoccupation on the part of the conferee.

Several teleconferencing display terminals have been proposed to overcome the problem of parallax. One solution to the problem involved positioning a camera behind a display screen that is capable of operating in two modes. The display screen is controlled to switch from the first or image display mode to the second or substantially transparent mode. In the first mode the screen displays images from video memory. In the second mode, the camera is controlled to record images appearing on the viewing side of the substantially transparent screen. Compactness results from the use of a flat panel display, such as a liquid crystal display.

While the system described above overcomes the parallax problem, the resulting image quality is poor because light received by the camera is greatly attenuated by the display screen. Moreover, the teleconferencing market will likely insist upon color display screens. The problem is further complicated in the case of color displays because of the large attenuation caused by color filters integrally formed in the display screen.

SUMMARY OF THE INVENTION

Improved image quality is realized in a parallax-free teleconferencing display by increasing the camera light budget, that is, by increasing the light available to the camera, while maintaining a common optic axis between the camera and the display screen. Light-attenuating devices, such as color filters, are repositioned out of the path of light entering the camera. In this manner, image quality is improved while color capability is maintained.

In an illustrative embodiment of the invention, a color dot projector is configured to project an array of red, green, and blue color dots onto a diffuse surface of the display screen. The color dots are projected onto a display screen that lacks color filters. By repositioning the color filters to a location away from the display screen, i.e., to the dot projector, the losses of the display screen are reduced and the camera light budget is increased. The dots of colored light are projected from a point adjacent to the camera and thus do not interfere with camera operation.

DETAILED DESCRIPTION

Figure 1:
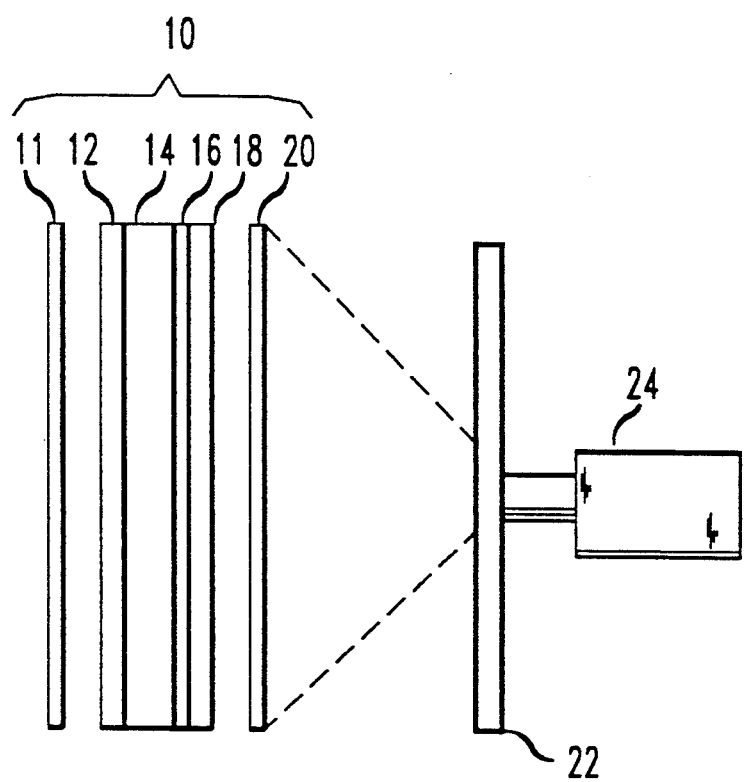
FIG. 1 is a simplified block diagram of a conventional liquid crystal display screen, together with a light source and camera.

FIG. 1 shows a conventional liquid crystal display 10 which includes a front polarizer 11, a front glass layer 12, a liquid crystal array 14, color filters 16, rear glass layer 18, and rear polarizer 20, all of which are integrated as a single unit. Liquid crystal array 14 includes several conventional elements which are not explicitly shown, such as a conducting layer, alignment layers on each side of the liquid crystal array, and a circuit layer. Each of the elements of the liquid crystal display attenuate light passing through the display to the camera, thus introducing losses. Images are displayed on the display screen by illuminating with white light through rear polarizer 20 from a backlight 22. A camera 24 receives light through liquid crystal display 10.

Light from backlight 22 is polarized by rear polarizer 20 and enters each liquid crystal cell of liquid crystal array 14. Liquid crystal array 14 comprises a predetermined number of independently-controllable cells. Each cell operates to rotate the polarization direction of light passing through the cell. The amount of polarization rotation caused by each cell is determined by an electrical control signal applied the respective liquid crystal cell. After passing through the cell, the light passes through front polarizer 11 and to the person viewing the display. The intensity of the light exiting each cell depends upon the degree of rotation, caused by the cell, of the polarization of the light relative to the polarization axis of front polarizer 11.

Three cells are grouped together to form a pixel of display 10. Each of the three cells (also referred to here after as "subpixels") is associated with a respective one of red, green, and blue color filters. To produce color on the display, light is allowed to pass through the three subpixels in the ratio required to produce the desired color.

When display screen 10 operates to pass light to camera 24, the presence of the color filters and other elements of the display screen reduces the light transmitted to the camera. An ideal color filter has a transmittance of about one-third for white light. In practice, color filters pass less than 100% of the light in their passband. Thus, the color filters block at least two-thirds of the white light passing through the cells. That is, the red light is blocked by the green and blue filters, the green light is blocked by the red and blue filters, and the blue light is blocked by the red and green filters.

We have realized that the light budget of the camera, that is, the amount of light that can pass from front polarizer 11 to camera 24, can be greatly increased by repositioning out of the path of camera 24 attenuation associated with the color filters and the rear polarizer.

Figure 2:
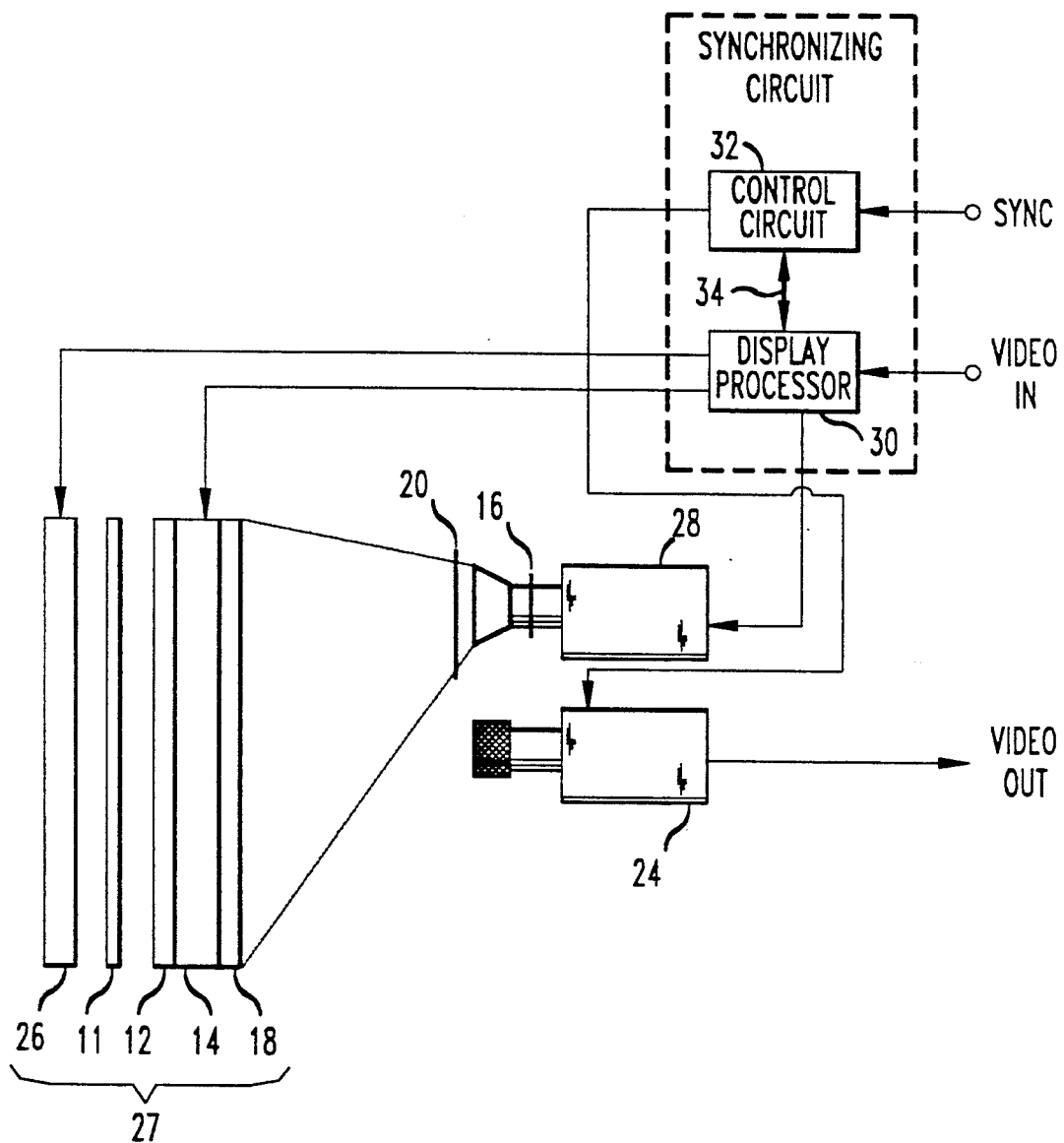
FIG. 2 is a simplified block diagram of an exemplary video display system constructed in accordance with the principles of the present invention.

FIG. 2 shows an exemplary embodiment of a video display system in which attenuation associated with the color filters is repositioned out of the path of camera 24 in accordance with the principles of the present invention. The display system comprises a display screen 27, camera 24, a light source 28, rear polarizer 20, and color filters 16. Display screen 27 includes a diffusing shutter means 26, front polarizer 11, and liquid crystal array 14. Repositioning rear polarizer 20 and color filters 16 out of the path of camera 24, but in the path of light output from light source 28, increases the light budget of camera 24 while maintaining color capability.

In the embodiment of FIG. 2, light source 28 is a dot projector (referred to hereinafter as dot projector 28) that projects a two-dimensional array of red, green, and blue dots of polarized light through the back surface of liquid crystal array 14 and onto the back surface of shutter means 26. During manufacture of the display system, red, green, and blue dots permanently focused on a different one of the three subpixels that form each pixel of display screen 27. Front polarizer 11 acts in combination with liquid crystal array 14 to attenuate and, thus, modulate the intensity of the colored light dots. Shutter means 26 diffuses the colored light dots to form an image on display screen 27. Liquid crystal array 14 does not include either a color filter layer or a rear polarizer.

Although the invention is described in the context of a twisted nematic liquid crystal display, it will be apparent to one skilled in the art that the principles of the invention are readily adaptable to other types of displays. For example, the invention can be adapted for use with flat screen displays, such as ferro-electric liquid crystal displays.

In general, camera 24 is mounted in a sufficiently centralized position behind display screen 27 to view persons watching the display thereby eliminating parallax by maintaining direct eye contact between the camera and the viewers. Camera 24 typically is mounted such that shutter means 26 is centered along the optic axis of the camera. Camera 24 employs an electrical, optical, or mechanical shutter to prevent light from reaching the camera when the camera is inactive. Camera 24 must have sufficient light sensitivity to maintain acceptable video output of viewers situated at a normal viewing distance from front polarizer 11 when recording images in available light. The transparency of the display screen can be optimized to minimize loss of available light. Cameras suitable for use as camera 24 include commercially available video cameras such as Sony models XC-711 and XC-007. Additionally, standard CCD sensor arrays or cameras employing imaging tubes may be used together with appropriate lens and focussing apparatus.

Figure 3:
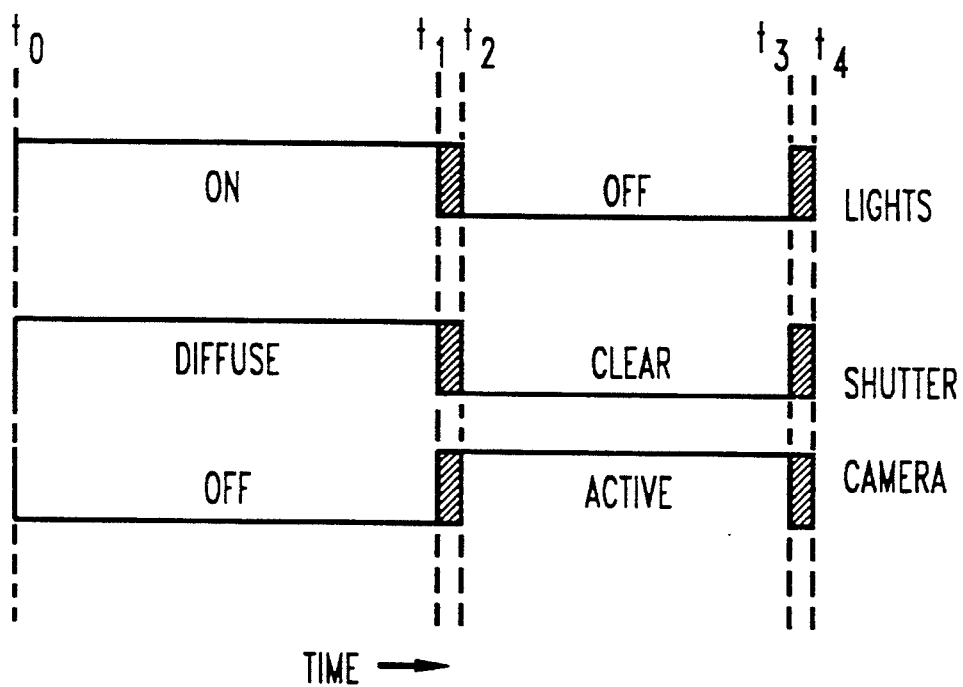
FIG. 3 shows an exemplary timing diagram for the video display system of FIG. 2.

Shutter means 26, dot projector 28, and camera 24 are multiplexed as shown in FIG. 3 to provide two modes of operation, namely, the "display" mode and the "camera" mode. In the display mode, information is displayed on shutter means 26 while camera 24 is inactive. During time interval t0-t1, dot projector 28 is energized and shutter means 26 operates in a "scattering" or diffuse mode. After a short delay (time interval t1-t2) to permit dot projector 28 and shutter means 26 to switch states, the display operates in the camera mode (time interval t2-t3). In the camera mode, camera 24 integrates light coming from the display to generate a video representation of a captured image, such as the viewer. Dot projector 28 is inactive and shutter means 26 operates in a "transparent" or substantially clear mode. After a short delay (time interval t3-t4) to permit the dot projector and shutter means to switch states, the system returns to the display mode. The repetition period, t0-t4, is repeated every 16.6 ms for conventional, NTSC-based systems.

Duty cycles are defined, for camera 24, as the ratio between the time period for the camera mode and the total frame period and, for dot projector 28, as the time period for the display mode of shutter 26 and the total frame period. The duty cycle determines the relative light levels received by camera 24 and by a person viewing the display. In order to achieve acceptable contrast and brightness of displayed video images for a viewer, the display is maintained in the display mode for a sufficiently long period of time. Similarly, shutter means 26 is to be maintained in the transparent mode for a sufficient period of time to achieve proper light levels for camera 24.

Although a duty cycle of 50% is used in the examples described herein, it is contemplated that duty cycles other than 50% can be utilized. The frequency of mode switching for the display is determined by the display technology and the frame rate of the display screen. It is important to note that mode switching is generally synchronized with the display frame, camera operation (depending on the integration time of the camera or other image sensing means), operation of light sources, and operation of shutter means 26. Generally, the frame rate for the display is chosen to be 1/30 second and, in a 50% duty cycle environment, the display is in the display mode for 1/60 second and in the camera mode for 1/60 second. The frame rate is defined above for non-interlaced frames on display screen 27. Where interlaced frames are desired, the rate of interest is the field rate wherein an odd and an even field comprise the frame. In all cases, the rates at which the display and camera operate preferably are selected so as to minimize flicker.

Synchronization between camera 24, shutter means 26, and dot projector 28 is maintained by a synchronizing circuit comprising a display processor 30 and a control circuit 32. The synchronizing circuit provides rapid time multiplexing between the camera and display modes of the display system to allow viewers to see the video images on the display directly while permitting camera 24 to record images of the viewers. The synchronizing circuit receives video images destined for display on shutter means 26 via a lead labeled VIDEO IN. Control circuit 32 develops fundamental synchronization from an externally supplied signal on the SYNC lead. Control circuit 32 utilizes standard circuits to manage operation of camera 24, shutter means 26, and dot projector 28. Display processor 30 converts the input video images to a form compatible with display screen 27. Since display processor 30 controls operation of the display screen, it is convenient to have it also control operation of dot projector 28.

A synchronization signal is supplied externally on the SYNC lead. The synchronization signal typically is supplied by a device external to the display system, but could alternatively be supplied from either camera 24 or display processor 30. This synchronization signal provides a reference for establishing timing intervals based upon either the beginning of a recording period by camera 24 or the beginning of a video image display period by display screen 27, for example. Coordination between control circuit 32 and display processor 30 is established by signals on lead 34.

We also have discovered that repositioning rear polarizer 20 out of the path of camera 24 eliminates the need to multiplex liquid crystal array 14 to actively switch data on the array between the camera and display modes. Although camera 24 receives light that is polarized in an orientation dependent on the display information (due to the action of front polarizer 11), liquid crystal array 14 is effectively clear to camera 24 because the camera is insensitive to polarization. Thus, liquid crystal array 14 may be set up to display data without concern for the effect of the state of liquid crystal array 14 on the operation of camera 24.

Figure 4:
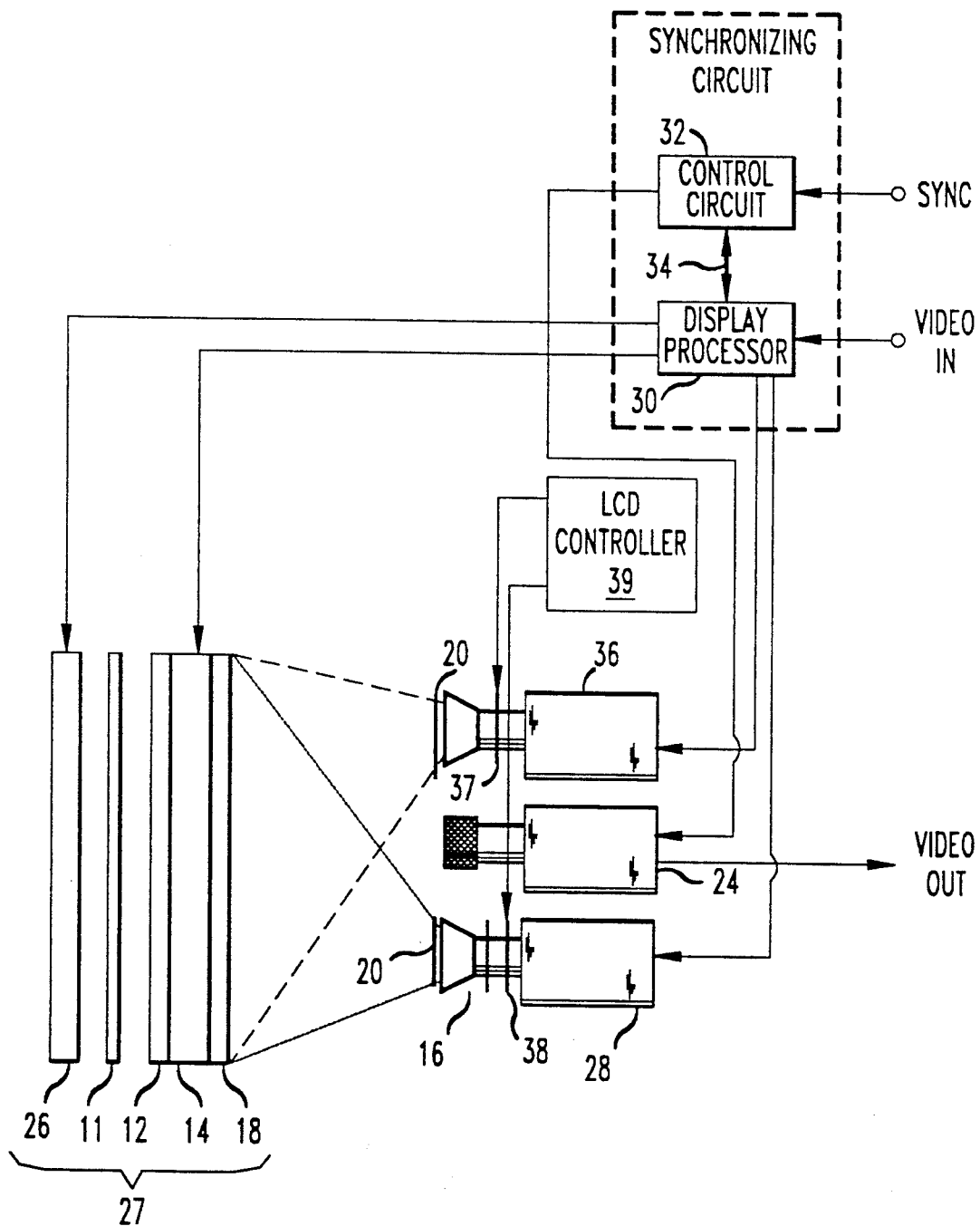
FIG. 4 is an alternative embodiment of the video display system of FIG. 2.

FIG. 4 shows an alternative embodiment of the display system of FIG. 2. A second dot projector, namely, white light projector 36, is provided in addition to color dot projector 28. Associated with white light projector 36 is a rear polarizer 20. In instances in which high resolution, rather than color, is at a premium (such as for text), color dot projector 28 can be switched out of the circuit using conventional switching circuitry and replaced with white light projector 36 to provide a high-resolution monochrome display. The effective number of pixels can be increased in this manner by a factor of three, because only one liquid crystal cell per pixel is required for a monochrome display. Display systems permitting both color and monochrome display that are suitable for use with the present invention are described in further detail in U.S. patent application Ser. No. 07/939,757 filed concurrently herewith and entitled, "Combined Color and Monochrome Display," which is hereby incorporated by reference.

In a further alternative embodiment of the invention, described below with respect to FIG. 4, liquid crystal arrays are provided in color dot projector 28 and white light projector 36, to selectively block light output from those devices. This selective blocking of light enables one portion of display screen 27 to be illuminated by only dot projector 28 while a different portion of display screen 27 is illuminated by only white light projector 36. This permits simultaneously displaying information on different segments of the display screen using both dot projector 28 and white light projector 36.

FIG. 4 shows liquid crystal arrays 37 and 38 for implementing the selective and simultaneous display of color and monochrome video data as described above. Liquid crystal array 37 is imaged on liquid crystal array 14 by white light projector 36. Liquid crystal array 38 is imaged on liquid crystal array 14 by color dot projector 28. Liquid crystal arrays 37 and 38 typically are low resolution arrays, such as 4×4 directly addressed, non-multiplexed arrays, although the arrays may be of any other suitable resolution such as 2×2 or 16×16. Arrays 37 and 38 are provided with the required rear polarizers (not shown).

Liquid crystal arrays 37 and 38 are controlled independently by a liquid crystal display controller 39. For example, the addressable elements of liquid crystal array 37 can be controlled to block light incident on the top half of array 37 from passing through array 37 while allowing light incident on the bottom half of array 37 to pass through the array. At the same time, the addressable elements of liquid crystal array 38 can be controlled to block light from color dot projector 28 incident on the bottom half of array 38 while passing light incident on the top half of array 38. In this example, the top half of display screen 27 will display color information, because only light from color dot projector 28 has been allowed to pass to the top half of display screen 27. Similarly, the bottom half of display screen 27 will display monochrome information, because only light from white light projector 36 has been allowed to pass to the bottom half of display screen 27. One skilled in the art will appreciate that color and monochrome video data can be displayed selectively at any location on the screen by appropriate control of liquid crystal arrays 37 and 38.

Figure 5:
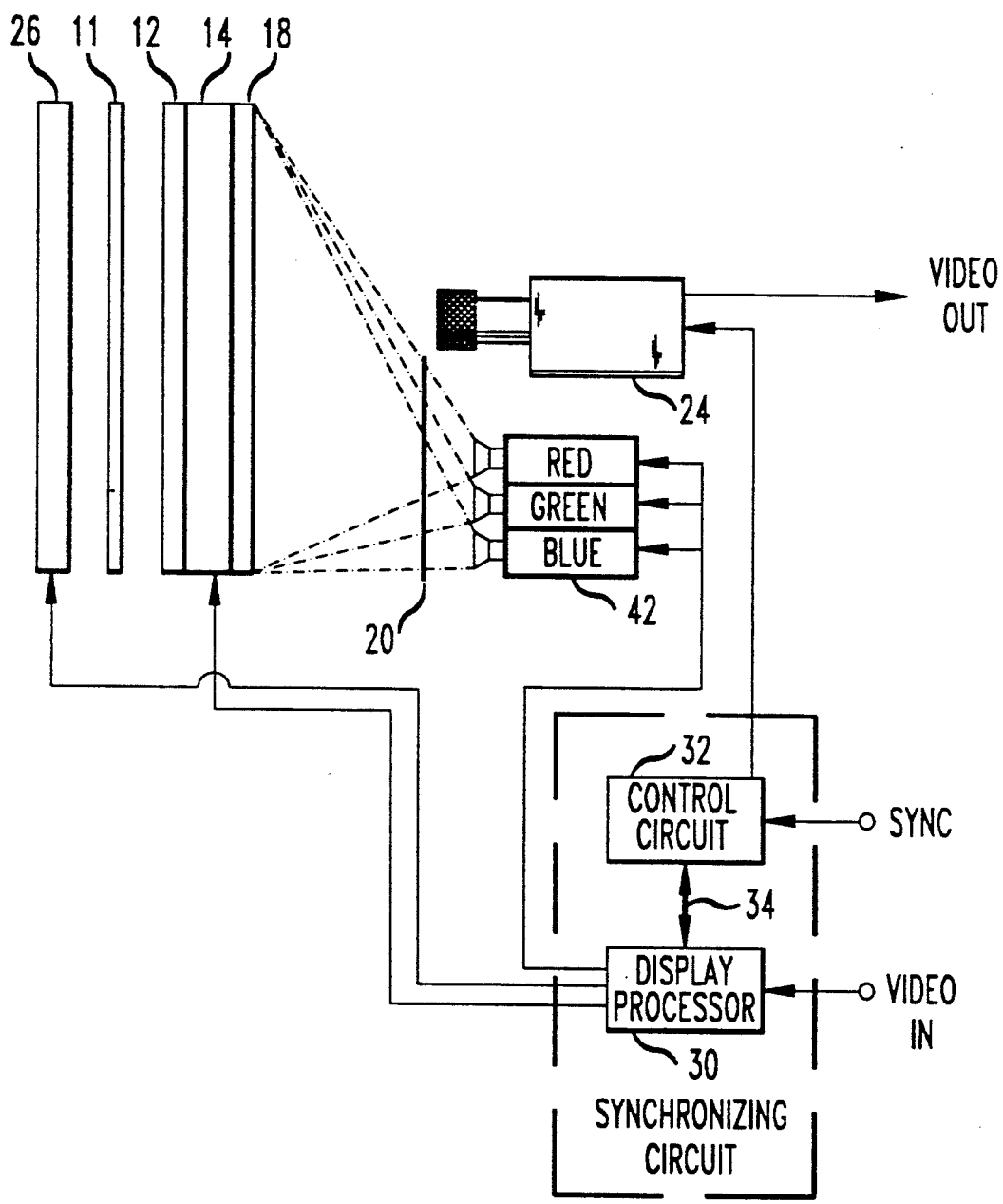
FIG. 5 is a simplified block diagram of an alternative embodiment of a video display system constructed in accordance with the principles of the present invention.

FIG. 5 shows an alternative embodiment of a display constructed in accordance with the principles of the present invention. As in the display system of FIG. 2, color filters 16 are repositioned out of the path of camera 24 and are embodied as switched light sources. Arrangement 40 includes front polarizer 11, liquid crystal array 14, rear polarizer 20, shutter means 26, camera 24, and switched light sources 42 for illuminating shutter means 26. Switched light sources 42 illustratively comprise a bank of three controllable light sources, namely, a red, a green, and a blue light source. As described below, each of the switched light sources 42 illuminates the entire area of display screen 27 (i.e., all pixels and subpixels) with a single color in a time-sequential manner. Because each of switched light sources 42 illuminates (sequentially) the entire display screen at once, it is unnecessary to pre-focus dots of light on each subpixel. Arrangement 40 operates by switching between the display and camera modes as discussed previously with respect to the arrangement of FIG. 2. Control circuit 32 and display processor 30 operate as described above to control the timing and operation of the camera and the display.

Figure 6:
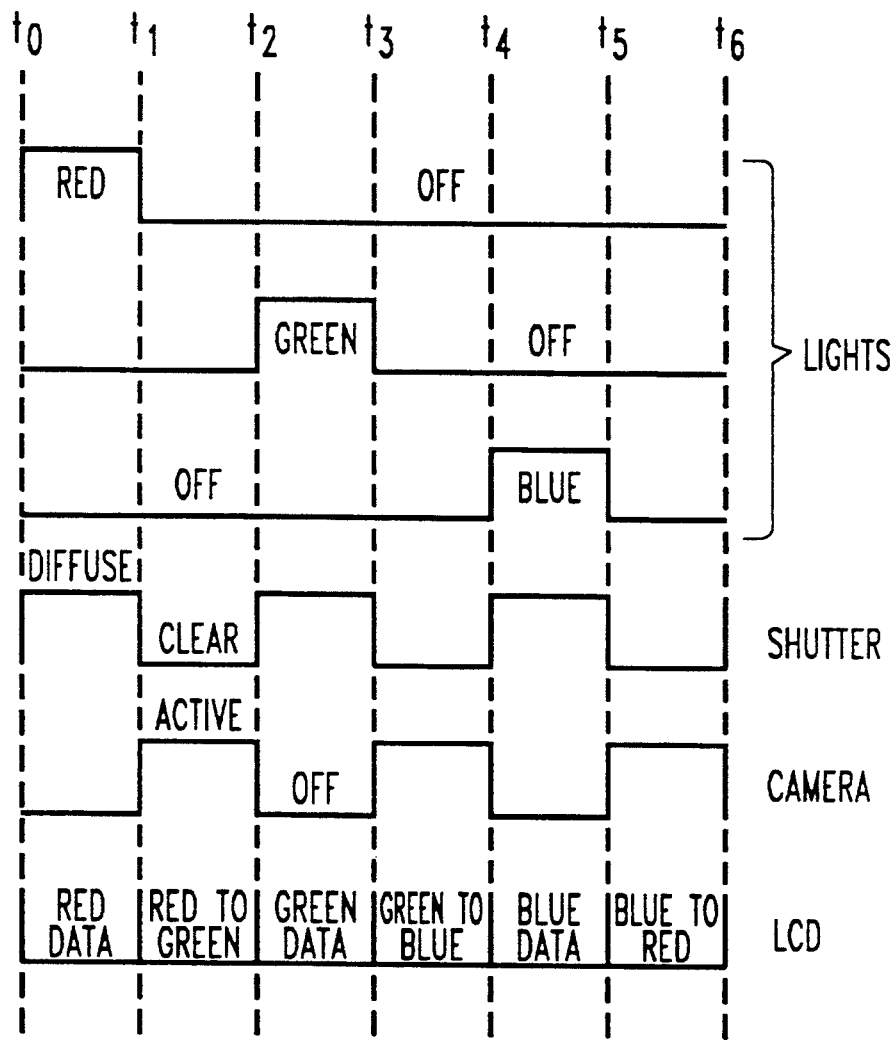
FIG. 6 shows an exemplary timing diagram for the video display system of FIG. 5.

FIG. 6 illustrates the timing of the operation of liquid crystal array 14, camera 24, shutter means 26, and switched light sources 42. Camera 24 is inactive during the display mode (time intervals t0-t1, t2-t3, and t4-t5). Liquid crystal array 14 is illuminated with red, green, and blue light in a time multiplexed fashion during time intervals t0-t1, t2-t3, and t4-t5, respectively. The display pixels of liquid crystal array 14 are controlled during time intervals t0-t1, t2-t3, and t4-t5 to pass the correct intensity of the illuminating color for the information to be displayed. For example, during time interval t0-t1, liquid crystal array 14 is controlled with the data for passing or blocking red light. Similarly, during time intervals t2-t3 and t4-t5, liquid crystal array 14 is controlled to pass or block green and blue light, respectively. The eye of a viewer then integrates the red, green, and blue images into a single color image. Time intervals t1-t2, t3-t4, and t5-t6 are provided to permit liquid crystal array 14 to be switched to display new data and to allow the light from switched light sources 42 to sufficiently decay. Data presentation in each of the three colors must be performed at a sufficient rate to prevent flicker.

During camera mode (time intervals t1-t2, t3-t4, and t5-t6), camera 24 is active, switched light sources 42 are off, and shutter means 26 is clear. Camera 24 operates in the manner described above with regard to FIG. 2.

The arrangement of FIG. 5 requires only one liquid crystal cell (i.e., subpixel) per color pixel. This is in contrast to three subpixels per color pixel required in prior art displays. Thus, smaller, less complicated, and more transmissive displays are possible. Also, the number of pixels in the display is increased by a factor of three. The display has the additional characteristic that all colors for a given color pixel come from exactly the same physical point on the display screen. Thus, the arrangement of FIG. 5 is useful for improving displays of both computers and televisions.

It will be understood that the foregoing is merely illustrative of the principles of the invention, and that various modifications can be made by those skilled in the art without departing from the scope and spirit of the invention. For example, a white light projector means and light blocking means can be used in conjunction with switched light sources 42 of FIG. 5 to simultaneously display color and monochrome images on shutter 26. Alternatively, the red, green, and blue light sources that form switched light sources 42 can be used to supply white light for a monochrome display by illuminating predetermined ones of monochrome pixels with light from all three light sources, in a time-multiplexed manner.

We claim:

1. A parallax-free teleconferencing display for providing images to a viewer, the display comprising:
    shutter means operating in one of a clear mode and a scattering mode, the shutter means having a surface for diffusing light impinging thereon when the shutter means operates in the diffusing mode;
    means for illuminating the diffusing surface of the shutter means with light comprising a plurality of discrete colors;
    means interposed between the shutter means and the illuminating means for modulating the intensity of the light from the illuminating means impinging on the diffuse surface to display color video images on the shutter means;
    image sensing means for collecting images of the viewer, the image sensing means generating a video representation of the viewer image;
    first synchronizing means connected to the shutter means and the illuminating means for controlling the shutter means to operate in the scattering mode and the illuminating means to illuminate the diffusing surface of the shutter means so that the video image is displayed on the shutter means during a first time interval; and
    second synchronizing means for controlling the shutter means to operate in the clear mode during a second time interval so that viewer images are recorded by the image sensing means through the shutter means.

2. The apparatus as defined in claim 1 wherein the illuminating means comprises controllably switched light sources for illuminating the diffusing surface of the shutter means with a plurality of discrete colors in a time multiplexed sequence.

3. The apparatus as defined in claim 1 wherein the modulating means comprises a plurality of monochrome liquid crystal cells arranged in an array of n rows and m columns, the array having input and output surfaces, and a polarizer on the output surface, each cell receiving linearly polarized light from the illuminating means on the input surface and selectively rotating the polarization of the light to vary the intensity of the light on the shutter means.

4. The apparatus as defined in claim 3 wherein the illuminating means comprises a dot projector means for projecting an array of red, blue, and green color dots onto the diffusing surface of the shutter means, each color dot passing through a different predetermined one of the monochrome liquid crystal cells.

5. The apparatus as defined in claim 1 further comprising: white light projector means for outputting white light onto the diffusing surface of the shutter means, the intensity of the white light being modulated by the modulating means.

6. The apparatus as defined in claim 5 further comprising means for switchably energizing one of the white light projector means and the illuminating means.

7. The apparatus as defined in claim 5 further comprising means for blocking light output from the white light projector means and the illuminating means such that a first portion of the shutter means is illuminated only by the white light projector means and a mutually exclusive second portion of the shutter means is illuminated only by the illuminating means.

8. The apparatus as defined in claim 7 wherein the blocking means comprises:
    a first array comprising a plurality of liquid crystal cells, the first array being imaged on the modulating means by the white light projector means; and
    a second array comprising a plurality of liquid crystal cells, the second array being imaged on the modulating means by the illuminating means.

9. The apparatus as defined in claim 1 wherein the image sensing means comprises a video camera.

10. The apparatus as defined in claim 9 wherein the video camera comprises a charge-coupled device array.

11. The apparatus as defined in claim 9 wherein the video camera comprises an imaging tube.

12. The apparatus as defined in claim 1 wherein the image sensing means has an optic axis and the shutter means is centered on the optic axis of the image sensing means.

13. The apparatus as defined in claim 1 wherein:
    the image sensing means operates at a frame rate that is substantially equal to the NTSC frame rate; and
    the illuminating means operates at a higher duty cycle than the duty cycle of the image sensing means.

14. A method for displaying color data on a display screen including a diffusing means and collecting images of a viewer viewing the display screen, the method comprising the steps of:
    transmitting light comprising a plurality of discrete colors through a monochrome liquid crystal array to illuminate the diffusing means during a first interval of time;
    applying a voltage representative of the data to the monochrome liquid crystal array to modulate the intensity of the light transmitted through the monochrome liquid crystal array and thereby display data on the diffusing means;
    collecting images of the viewer with an image sensing means during a second interval of time, the image sensing means generating a video representation of the viewer image;
    controlling the diffusing means to operate in a scattering mode during the first interval of time; and
    controlling the diffusing means to operate in a clear mode during the second interval of time so that the images of the viewer are recordable by the image sensing means through the diffusing means.

15. The method as defined in claim 14 wherein the transmitting step comprises transmitting the plurality of discrete colors in a time multiplexed sequence.

16. The method as defined in claim 14 wherein the transmitting step comprises outputting an array of red, blue, and green color dots through the monochrome liquid crystal array onto the diffusing means.

17. The method as defined in claim 14 further comprising the steps of:

transmitting white light through a predetermined area of the monochrome liquid crystal array and onto the diffusing means; and applying a voltage representative of monochrome video data to the predetermined area of the monochrome liquid crystal array to modulate the intensity of the white light passing through the predetermined area and thereby display monochrome video data on the diffusing means.

18. The method as defined in claim 17 further comprising the step of blocking at least a portion of the white light and at least a portion of the light comprising a plurality of discrete colors such that a first portion of the diffusing means is illuminated only by the white light and a second portion of the diffusing means is illuminated only by the light comprising a plurality of discrete colors.

* * * * *